United States Patent [19]
Gaskill et al.

[11] Patent Number: 5,481,254
[45] Date of Patent: Jan. 2, 1996

[54] GROUP MESSAGE DELIVERY IN A TIME-DIVISION MULTIPLEXED PAGING SYSTEM

[75] Inventors: Garold B. Gaskill, Tualatin; Dennis J. O'Brien, West Linn; Michael C. Park, Portland, all of Oreg.

[73] Assignee: Seiko Communications Holding N.V., Netherlands

[21] Appl. No.: 147,834

[22] Filed: Nov. 2, 1993

[51] Int. Cl.⁶ ............................. H04Q 7/00; H04J 3/24
[52] U.S. Cl. ..................... 340/825.52; 340/825.44; 455/38.1; 370/94.1
[58] Field of Search ............... 340/825.44, 825.52, 340/825.47, 311.1; 455/38.1, 38.3, 343; 370/94.1

[56] References Cited

U.S. PATENT DOCUMENTS

| | | | |
|---|---|---|---|
| 4,668,949 | 5/1987 | Akahori et al. | 340/825.44 |
| 4,713,808 | 12/1987 | Gaskill et al. | 340/825.44 |
| 4,734,694 | 3/1988 | Umatsu et al. | 340/825.44 |
| 4,818,987 | 4/1989 | Ide et al. | 340/825.44 |
| 5,089,813 | 2/1992 | DeLua et al. | 340/825.44 |
| 5,155,479 | 10/1992 | Regan | 340/825.44 |
| 5,241,305 | 8/1993 | Fascenda et al. | 340/825.44 |
| 5,311,516 | 5/1994 | Kuznicki et al. | 340/825.44 |

*Primary Examiner*—Donald J. Yusko
*Assistant Examiner*—Edward Merz
*Attorney, Agent, or Firm*—Elmer Galbi

[57] ABSTRACT

Group message delivery in a time multiplexed paging system is accomplished by providing in normal message packets a group ring indicator. A paging device collecting a message interrogates the group ring indicator to determine availability of a pending group message. If a group message is available, the paging device can target a dedicated time slot associated with group message transmission. In this manner, a single transmission of a group message is made available to all paging devices of the paging system. In one embodiment, the group ring indicator is a single bit indicating merely availability of a pending group message, the paging device then targeting and collecting the available group message to determine whether the paging device subscribes to that particular group message service. In a second embodiment, the group ring indicator indicates not only availability of a group message, but also the type of group message available. The paging device thereby determines based on the value of the group indicator whether the indicated available group message need be pursued.

18 Claims, 5 Drawing Sheets

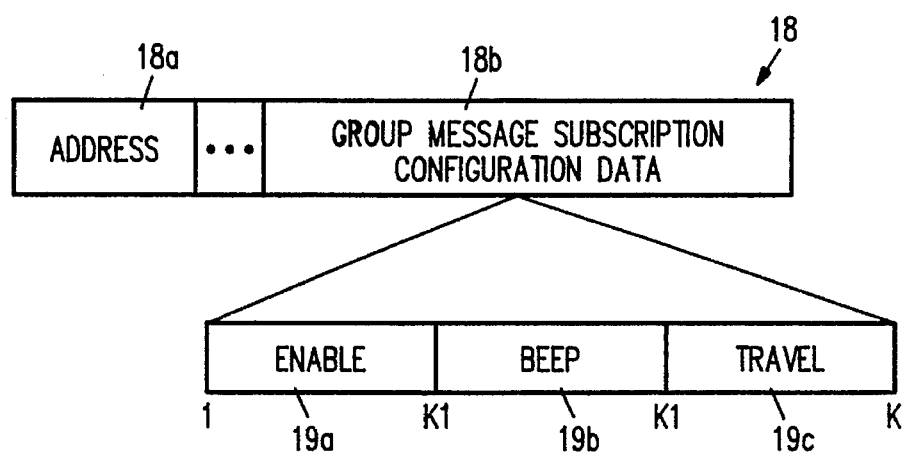
FIG. 3
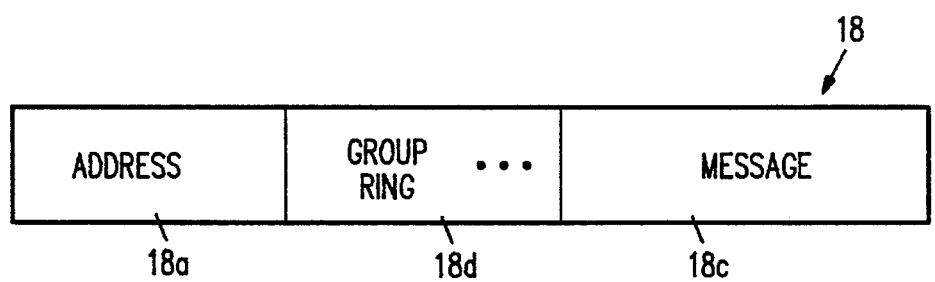
FIG. 4
FIG. 5

GROUP MESSAGE DELIVERY IN A TIME-DIVISION MULTIPLEXED PAGING SYSTEM

BACKGROUND OF THE INVENTION

The present invention relates generally to communication systems, and particularly to paging systems delivering messages in common to a set of paging devices according to, for example, an information subscription service or group paging service.

Paging devices are typically small radio signal receiving and paging information storing devices carried by the paging device user as a personal accessory throughout the day. Typically, paging information, i.e., a paging message, arrives as a telephone number to be called in response to the page. The person originating the page dials a telephone number associated with a given paging device and, in response to, for example, voice prompts, enters a sequence of digits to be presented on a display of the paging device.

Paging devices have evolved, however, beyond simply delivering a telephone number to be called. Paging devices can serve as personal information terminals receiving a variety of information in addition to telephone numbers to be dialed in response to the page. Information delivered to a paging device can assume a common format, e.g., a multiple digit numeric message. While a message may appear in form as a telephone number on the paging device display, however, a prearrangement between the person originating the page and the person receiving the page can provide a basis for more sophisticated information delivery. According to such prearrangement, information delivered in the format of a telephone number, or given digit pattern, can represent anything from personal information, such as a bank account balance, to information of general interest, such as sports scores or weather information. For paging devices capable of displaying alphanumeric messages, and for message sources capable of generating an alphanumeric message, the message can be presented literally on the paging device display.

Information content delivered to a paging device used as a personal information terminal can vary according to various information service subscriptions available through the paging service. For example, a paging service can broadcast information to a number of people subscribing to a general interest information service. Such group broadcast information is delivered to subscribing sets of paging device users. For example, local weather, local sports scores, stock market information, and a great variety of other general interest information can be delivered to groups of subscribing paging device users. Information delivered can also be of personal interest and directed to a specific paging device user. For example, a bank account balance may be directed to a specific paging device user according to a service subscription with the paging service.

As may be appreciated, information of personal interest to single paging device user is handled generally in the manner of other paging messages. The message data can, for example, be submitted to the paging system by way of direct data link, as opposed to manipulation of a telephone keypad. Thus, a banking institution might deliver a batch of bank account data, including an account balance data and identification of the specific paging device to which each balance datum is to be delivered. Generally such information subscriptions are easily integrated into the paging system message delivery protocol along with other message data directed to specific paging devices. In particular, such additional personal messages do not degrade system message handling capacity.

Information subscriptions of general interest, i.e., a group message sent in common to a given set of paging devices, can impact message handling capacity of the paging system, especially a time-division multiplexed paging system protocol. The subject matter of the present invention relates to delivery of such group messages without degradation in system capacity, i.e., without stealing excessively from message delivery bandwidth.

In a conventional paging system, not a time-division multiplexed system, wherein each paging device is always active and monitoring a given radio frequency for occurrence of a specific address, group message delivery is accomplished by simply programming the paging devices to watch for additional addresses, i.e., an address for a group information subscription. When such a paging device detects a group message address of interest, i.e., one to which its user has subscribed, the paging device simply collects the associated message and displays the collected message.

In a time-division multiplexed paging protocol, however, delivering group messages can degrade system capacity. For the present discussion, a time-division multiplexed paging system associates given time intervals with one or more paging devices. The paging devices seek paging information primarily only during the associated time interval. In this manner, for example, power consumption is reduced by allowing the paging device to de-activate its radio receiving circuitry at times other than its associated time interval.

One approach to group message delivery in a time-division multiplexed paging system requires the paging system to generate individual messages, i.e., individually addressed, for each of the subscribing users of a given information service. The paging system would generate one message for each member of the group, and simply pass these messages through the system in the manner of individually addressed personal messages. Unfortunately, such a method requires additional processing overhead by the paging system in managing user profiles indicating membership in given groups, i.e., subscription to given information services, and also requires that multiple occurrences of the same message be generated and transmitted by the system.

Another approach to delivering group messages in a time-division multiplexed paging system is to flood all time intervals with the same group message. In this manner all paging devices collect the group message and, if the collected message is of interest, i.e., an information subscription service to which the user has subscribed, the paging device displays the collected message. Unfortunately, such method monopolizes the entire message delivery bandwidth for delivery of a single message to a given subset of paging devices. Also, certain messages may already be queued for transmission and the group message is delayed until an entire bandwidth of time intervals is available for flooding of the group message. While the group message is being broadcast, i.e., flooded across an entire spectrum of time intervals; regular personal message delivery is delayed. Thus, both normal or personal messages and group messages are not timely delivered.

Accordingly, it would be desirable to provide in a time-division multiplexed paging system a method for group message delivery not requiring delay in personal message delivery or in group message delivery. All messages should be timely broadcast without significant delay so as to provide prompt personal message delivery as well as up-todate or current group message information. Furthermore, such method should not use an inordinate amount of message delivery bandwidth. Thus, broadcast of group messages should not require any significant additional message delivery bandwidth beyond that required for personal message delivery.

SUMMARY OF THE INVENTION

Group message delivery in a time-division multiplexed paging system is accomplished efficiently under the present invention by allocating a group ring indicator field in each message packet definition. When a paging device captures a message packet according to normal operation, i.e., captures a message packet during its associated time interval, interrogation of the group ring indicator indicates availability of a group message. In response to the group indicator, the paging device collects the group message in a given or designated group message time interval. Thus, by first providing a ring indicator to paging devices, the paging devices are prepared to activate and capture a single broadcast of the group message. In this manner, the group message need only be transmitted once to provide opportunity for collection in common by a set of paging devices.

The group ring indicator may take a variety of forms. In a simple implementation of the present invention, the group ring indicator is a single bit in each regular message packet indicating to the paging device that an available group message is to be targeted for collection in a predesignated time interval. In a more sophisticated implementation of the present invention, a multi-bit group ring indicator represents the type of group message available, and thereby provides a basis for group message collection, i.e., allows the paging device to determine based on the indicated type of group message available whether or not such message is to be targeted and collected according to the information subscription profile of the paging device.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which:

FIG. 3 illustrates a special message packet sent to a specific paging device to establish an information service subscription configuration in aid of collecting group messages.

FIG. 4 illustrates a portion of memory of a paging device storing information service subscription data as received by way of the special message packet of FIG. 3 and dictating processing of available group messages.

FIG. 5 illustrates message packet format, including a group message ring indicator according to the present invention.

DETAILED DESCRIPTION OF THE PREFERRED EMBODIMENT

The present invention will be illustrated in the context of a time-division multiplexed paging system employing personal paging devices, e.g., wristwatch paging devices, serving as personal information terminals. U.S. Pat. Nos. 4,713, 808 issued Dec. 15, 1987 to Gaskill et al and 5,155,479 issued Oct. 13, 1992 to Ragan et al describe a time-division multiplexed paging system wherein paging device power consumption is greatly reduced by a synchronized transmission protocol wherein radio receiver circuitry of individual paging devices is activated only during predetermined, brief associated time slots to monitor a selected one of several broadcast stations, or frequencies, for message data. The one or several broadcast stations are programmed to broadcast message data for selected paging devices during time slots associated with the destination paging device. Remote paging devices, having radio receivers active only during brief monitor intervals, conserve power, yet reliably receive message data. The combined disclosure of the above-referenced U.S. Pat. Nos. 4,713,808 and 5,155,479 may be referenced for further information beyond the scope of the present invention.

It will be understood, therefore, that the time-division multiplexed paging system described herein includes synchronization between the paging system broadcast facilities and individual paging devices to coordinate activation of radio receiving circuitry of each paging device with its associated time slot or time slots. Additionally, each paging device can target a selected time slot of the broadcast protocol as needed, for example to collect a group message as described more fully hereafter.

Figure 1:
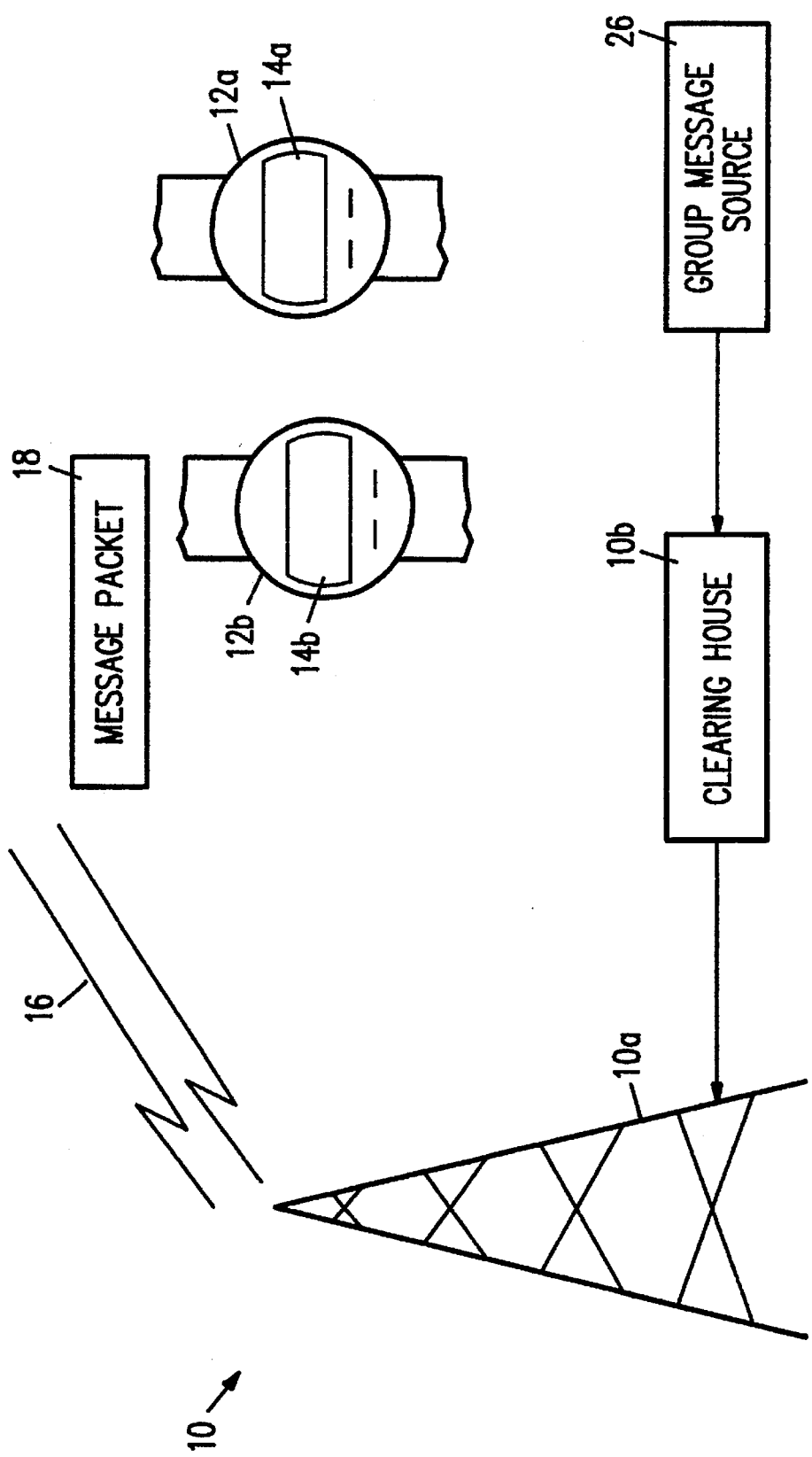
FIG. 1 illustrates schematically a paging system including paging devices used as personal information terminals receiving message packets and adapted under the present invention to collect group messages.

In FIG. 1, paging system 10, including a broadcast facility 10a and a clearinghouse 10b, receives information from a variety of sources for broadcast to paging devices 12. Two types of such paging devices 12, individually 12a and 12b, are shown in FIG. 1. Each paging device 12 includes a display panel 14 for presentation of captured messages. Display panel 14a of device 12a is a numeric display, limiting messages displayed by device 12a to numeric content. Display panel 14b of paging device 12b, however, is an alphanumeric display allowing paging device 12b to present messages literally, i.e., actual message text as opposed to a message encoded in numerical form. Messages are formatted in message packets 18 and transmitted by radio signal 16 to paging devices 12 according to a time-division multiplexed broadcast protocol, described more fully hereafter. Generally, each paging device 12 is associated with a time slot or group of time slots and activates its radio receiving circuitry during its associated time slot or time slots. Radio signal 16 may actually constitute a collection of broadcast frequencies each broadcasting according to offset time frames to allow paging devices 12 to switch to a different frequency and capture a message in the event of failure to properly synchronize on a frequency, or failure to collect valid data on a frequency. Generally, each paging device 12 can target a selected time slot and broadcast frequency of the time-division multiplexed broadcast protocol and capture message packets 18 during a targeted time slot.

A message packet 18 delivered to a paging device 12 may be a personal message, i.e., directed to a specific one of paging devices 12, or as provided under the present invention a group message, i.e., delivered in common to a set of paging devices 12. Traditional personal messages include messages originating from a telephone call placed to clearinghouse 10b and specifying a telephone number to be called in response to the page. Another type of personal message might originate from an information source associated with a given paging device 12 user and using system 10 to deliver specific information, e.g., a banking institution delivering a bank account balance to a specific user by way of paging system 10.

Some message packets delivered to paging device 12 are provided as part of group information service subscriptions. Information of general interest, i.e., as distinguished from personal information relative only to an individual user of system 10, is taken by system 10 from group message source 26. Source 26 represents information from a variety of sources, each providing general interest information to paging system 10 for relay to groups of subscribing users of system 10. For example, source 26 provides local weather, local sports, and stock information to paging system 10. In turn, paging system 10 delivers such information to corresponding user groups subscribing to these information services. For example, a person using paging device 12 might obtain on a daily basis the current temperature or daily Dow-Jones industrial average. Such information could be coded by prearrangement in the format of a multiple digit numeric paging message, i.e., appear on paging device 12a in the form of a telephone number or particular digit pattern, but indicate message type. For paging device 12b, however, such information can be presented literally on alphanumeric display 14b.

As may be appreciated, source 26 may actually constitute a variety of messages sources, each in contact with system 10 and delivering group message data with system 10 providing such data to selected, i.e., subscribing, paging device 12 users. For the present discussion, however, source 26 will be treated as a single entity with the understanding that group message data may originate from a number of actual sources.

Thus, paging system 10 offers to its customers a variety of services beyond conventional paging message delivery. Each customer can subscribe to certain information services in addition to conventional paging services. Customers might subscribe to a personal data information service, e.g., bank account balance information, or to group information services, such as local sports scores and local weather conditions.

In accordance with the present invention, delivery of group messages to selected sets of paging devices 12 is accomplished with limited reduction in overall system capacity and, further, in a prompt manner permitting delivery of current information to subscribing users of paging devices 12.

Figure 2:
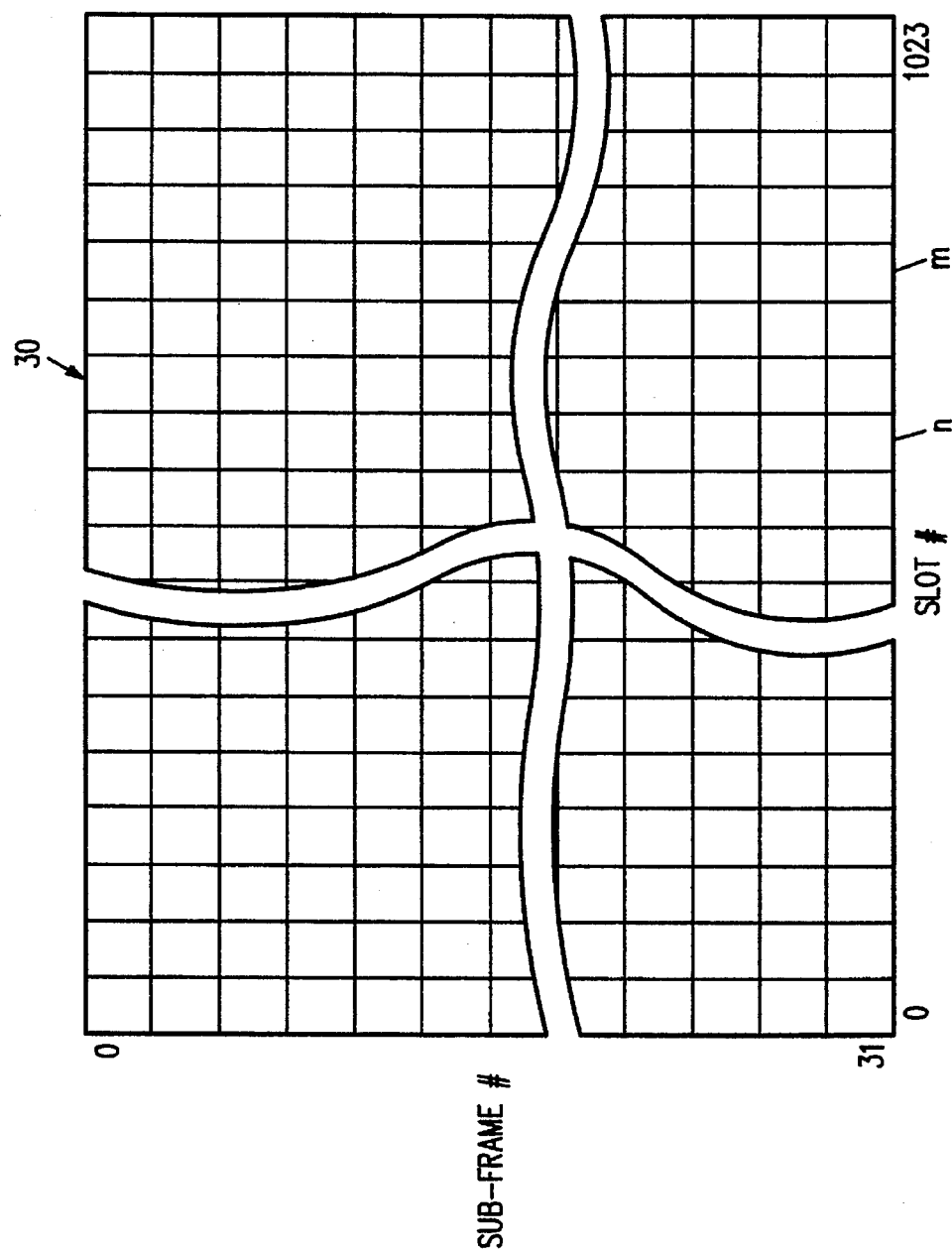
FIG. 2 illustrates a time-division multiplexed broadcast protocol used by the paging system of FIG. 1 in transmission of the message packets including designated group message time slots for use in delivering group messages in common.

FIG. 2 illustrates generally the time-division multiplexed broadcast protocol of paging system 10 for one broadcast frequency. In FIG. 2, clearinghouse 10b and each of paging devices 12 reference a time frame 30 divided into subframes, individually numbered 0–31 and appearing as rows in FIG. 2. Each sub-frame is further divided into time slots, individually numbered 0–1,023 in FIG. 2. Thus, each of 32 sub-frames includes 1,024 time slots in which a message packet 18 may be broadcast. Each paging device 12 is associated with one or more such time slots within time frame 30 and may synchronously activate its radio receiving circuitry to capture a message packet 18 during an associated one of the time slots of time frame 30. Certain ones of the time slots may be control or system data time slots, e.g., the first three time slots of each sub-frame, during which certain control and system information is broadcast for paging devices 12 to intermittently capture when necessary. Generally, however, paging devices 12 activate during associated time slots and capture a message packet 18.

Each message packet 18 includes an address field interrogated by a paging device 12 to determine whether a captured message packet 18 is to be accepted and further processed, i.e., displayed and stored. Providing an address value within message packet 18 allows several paging devices to share or target a single time slot of time frame 30, yet determine whether a captured packet is intended for that paging device. Each paging device may be associated with several time slots, For example, a paging device 12 may activate and capture a message packet 18 eight times during each iteration of time frame 30. For example, a given paging device 12 is associated with a given time slot number and activates during that time slot of selected sub-frames, such as sub-frame numbers 6, 10, 14, 18, 22, 26, and 30.

In the preferred embodiment of the broadcast protocol, time frame 30 is of predetermined length, such as 7½ minutes, and repeats cyclically. Thus, each sub-frame is approximately 14 seconds long and each time slot of time frame 30 is approximately 14 milliseconds long. Paging system 10 as described herein thereby provides synchronized transmission and message capture. Each paging device 12 can determine a sub-frame number and slot number associated with a captured message packet for the purpose of maintaining system synchronization.

In accordance with the present invention, certain time slot numbers are dedicated to group message delivery. For example, slot n is dedicated to numeric group message delivery for paging devices 12a and slot number m is dedicated to alphanumeric group message delivery to paging devices 12b. As may be appreciated, for additional types of paging devices 12 requiring differentiation in message format, additional slot numbers can be allocated to group message delivery for such additional paging device types. Group messages are collected by paging devices in the pre-assigned time slots for each paging device type.

Group message paging requires association of a set of paging devices 12 with each information service subscription. Such association is established and maintained in clearinghouse 10b in accordance with customer profile information and for the purpose of, perhaps, billing requirements relative to information service subscriptions. In accordance with the present invention, such association is also maintained within each of the paging devices 12. In particular, each paging device 12 memory includes a group message configuration register indicating subscription to particular group information services, and as will be explained more fully hereafter, additional enhancement features relative to each group information subscription service.

FIG. 3 illustrates a special message packet 18 transmitted to a paging device 12 to implement association of that paging device 12 with a given set of group message information subscription services, i.e., enable or disable collection of particular information subscription services. In FIG. 3, a message packet 18 includes an address field 18a and a group message subscription configuration data field 18b. To establish a given information subscription association with a specific paging device 12, the message packet 18 is transmitted in the time slot, or slots, associated with that paging device 12 and bears in address field 18a the address of the intended paging device 12. When the intended paging device 12 activates during its associated time slot, it collects the message packet 18 shown in FIG. 3 and, after verifying address field 18a as matching its address, accepts the group message subscription configuration data field 18b to enable or disable collection of particular information subscription services.

The subscription configuration data field 18b includes a bit for each available group information subscription service, and also additional enhancement data. For example, each available group message subscription service in paging system 10 may be assigned a number in the range 1 to k. In this manner, a k-bit field can enable or disable each group message subscription service. Thus, group message subscription configuration data 18b includes a k-bit enable field 19a wherein each bit in field 19a designates subscription or not subscription to the associated group message subscription service. For example, if the third bit in field 19a is set to 1, then the group message subscription service assigned number 3 in the range 1 to k is enabled indicating to paging device 12 that such group messages should be collected, presented for display and stored.

Additional enhancement fields may also be provided in group message subscription configuration data 18b. For example, a k-bit beep field 19b of group message subscription configuration data 18b includes a bit for each of the group message subscription information services. The value of a bit in field 19b dictates whether the paging device 12 will activate an alarm in association with displaying a given group message. For example, if the third bit in field 19b is set to 1 then when a group message service assigned number 3 is collected and displayed then paging device 12 will also present an alarm at the time of message presentation. Finally, a k-bit travel field 19c indicates whether a paging device should decline a given group message when outside its home region. As with fields 19a and 19b, the position of a given bit indicates association with a given group message information service. The travel enhancement allows a user to decline group messages when not relevant, i.e., not relevant because the paging device is not in its home region. For example, a traveling user of paging device 12 may not be interested in local sports scores. Local weather, however, may be of interest to a traveling paging device 12 user.

Thus, the special configuration packet 18 illustrated in FIG. 3 provides a mechanism for downloading group message service configuration data to a specific paging device 12. As may be appreciated, such data may be developed by way of interaction with the user of the specific paging device 12 in establishing or removing information subscription services. For example, the user might interact with an operator or automated system of clearinghouse 10b to activate or deactivate certain information subscription services, or modify the enhancement features relative to particular information subscription services. Once such information is developed at clearinghouse 10b, the special configuration message packet 18 illustrated in FIG. 3 is transmitted to the intended paging device 12 for establishing an information service configuration register thereof.

FIG. 4 illustrates a portion of the memory of a paging device 12 representing group message service configuration register. In FIG. 4, an array of three bit values indexed by group message service numbers in the range 1 to k is available to determine whether a given group message information subscription service is to be pursued by the paging device 12. For each member of the 1 to k element array, a subscription bit, a beep bit, and a travel bit determine, respectively, association or disassociation with the corresponding group message information service, alarm activation upon receipt of a group message, and a group message travel feature. In the example illustrated in FIG. 4, the group message information service subscription assigned numeral 3 is enabled by setting to value one the associated subscription bit. The alarm bit for group message information subscription service 3 is set to one to indicate that an alarm, i.e., beep, is desired upon receipt of group messages of subscription service 3. A travel bit is set to zero to indicate that when the paging device 12 is outside its home region, i.e., while the paging device 12 is traveling, the associated group message information service is not to be accepted for processing.

Thus, the group message information service configuration data held in the memory register illustrated in FIG. 4 may be developed and modified by transmitting to the paging device 12 the special configuration data message packets 18 as illustrated in FIG. 3. Each paging device 12 thereby maintains a group message service configuration register indicating whether a particular group message information subscription service is to be pursued, and further what enhancements may be employed relative to that information subscription service.

FIG. 5 illustrates a message packet 18 transmitted in normal broadcast of message data to paging devices 12. In particular, the address field 18a employed by the receiving paging device determines if a message field 18c is to be collected and further processed, i.e., whether the message field 18c is intended for that paging device. In accordance with normal broadcast protocol, the message packet 18 of FIG. 5 is transmitted to a paging device 12 during a time slot associated with that paging device 12. When a paging device 12 activates its radio receiving circuitry and captures the message packet 18, it interrogates the address field 18a to determine if the message of field 18c is to be further processed, i.e., displayed and stored as a received message.

The message packet 18 of FIG. 5 further includes, in accordance with the present invention, a group ring indicator 18d. In conjunction with normal message capture and processing, each paging device 12 interrogates the group ring indicator 18d to determine pending availability of a group message. In one embodiment of the present invention, the group ring indicator 18d can be a single bit indicating simply availability of a group message. In response to such indication of group message availability, a paging device 12 targets a specific time slot of certain upcoming sub-frames and collects the group message. Once the group message is collected, paging device 12 determines the type of group message, i.e., assigned subscription service number, and then references the group message service configuration register as illustrated in FIG. 4 to determine if the collected group message should be further processed, i.e., displayed and stored within paging device 12.

In a second embodiment of the present invention, the group ring indicator 18d can be multiple bits indicating not only pending availability of a group message, but also the type of group message. For example, a group ring indicator bearing all zeros would indicate no group message currently available, but a non-zero value in the group ring indicator, i.e., an information subscription service number in the range 1 to k, indicates not only availability of a group message but also the type of group message, i.e., the assigned group message number. In this manner, the paging device 12 can determine by reference to its group message service configuration register whether the available group message should be pursued, i.e., whether the paging device should target a specific time slot to collect the group message.

Figure 6:
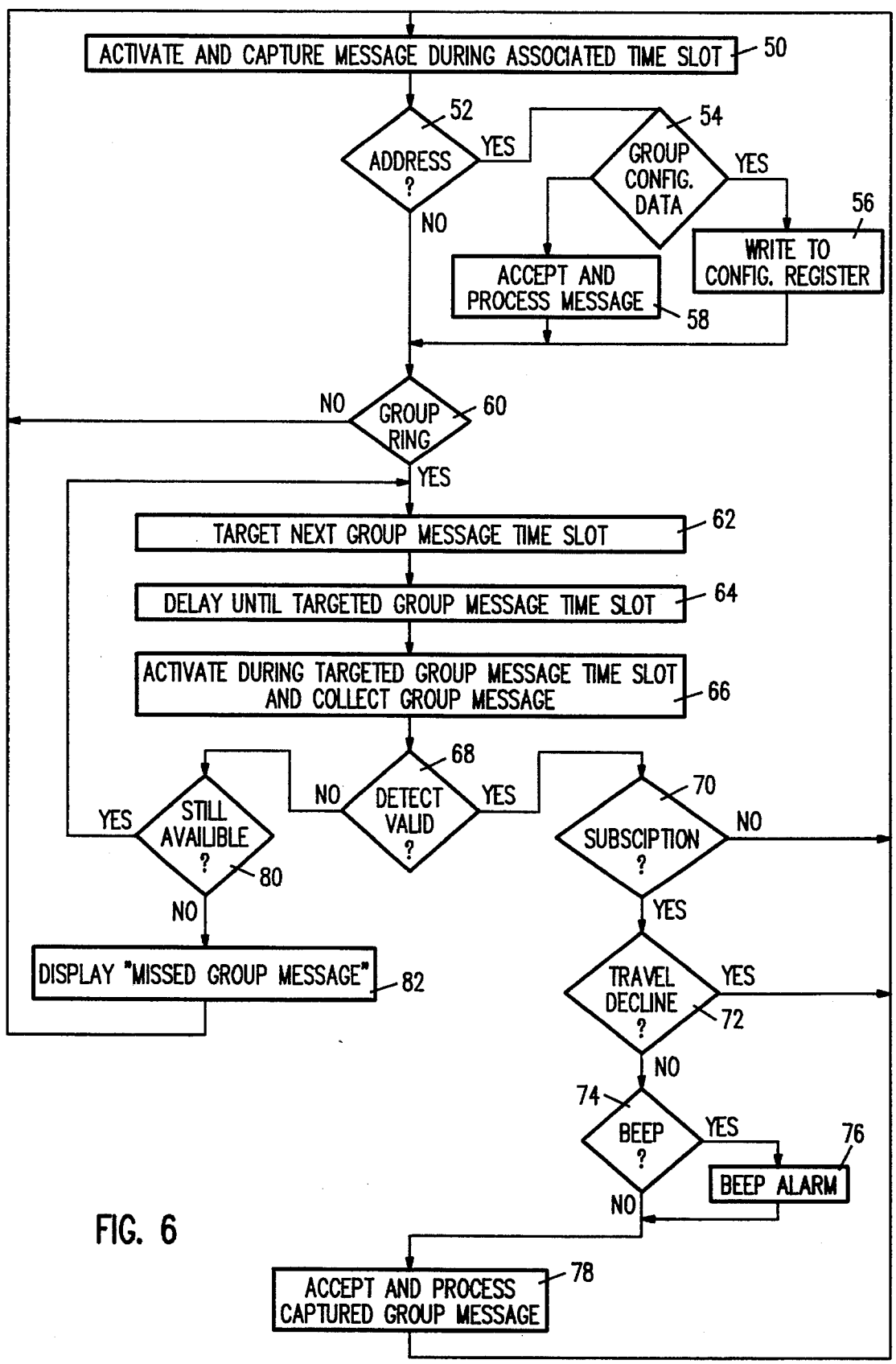
FIG. 6 illustrates programming executed by a paging device relative to detecting availability of a group message as a function of a group message ring bit, collection of an available group message, and determination as to display and storage of a collected group message according to a group message subscription configuration.

FIG. 6 illustrates programming of a paging device 12 relative to message packet 18 collection, and particularly to pursuit of available group messages according to the first embodiment of the present invention wherein the group ring indicator 18d is a single bit indicating only availability of a group message. In FIG. 6, paging device 12, in accordance with normal broadcast protocol, activates its radio receiving circuitry and captures a message packet 18 during a normal message slot, i.e., during a time slot associated with the paging device 12. Following activation and capture of a message packet 18 in block 50, paging device 12 interrogates the address field 18a in decision block 52. If the address field 18a of the captured message packet 18 matches the address for the paging device 12, then processing advances to decision block 54 wherein paging device 12 determines whether the captured message packet contains a group message service configuration data field 18b.

If a configuration data field 18b is present, then processing advances to block 56 where paging device 12 writes the new configuration data into its group message service configuration register (FIG. 4).

If the captured message packet 18 does not include a configuration data field 18b, but rather a normal message field 18c (FIG. 5) then processing advances from decision block 54 to block 58 where paging device 12 accepts and processes the captured message field 18c, i.e., displays the message and stores the message for later reference. Processing advances from either of blocks 56 or 58 to decision block 60 where paging device 12 interrogates the group ring indicator 18d (FIG. 5). If the group ring indicator indicates no group messages presently available, then processing returns to block 50 where paging device 50 delays until its next normal message slot in accordance with normal operation, and then collects the next occurring normal message packet 18.

If, however, the group ring indicator 18d indicates availability of a group message, i.e., the group ring indicator bit is set to a value 1, processing advances from decision block 60 to block 62 where paging device 12 targets the next available group message slot. The particular group message slot targeted depends on the type of paging device 12. For example, a paging device 12a would target the next available time slot n (FIG. 2) whereas a paging device 12b would target the next available time slot m (FIG. 2). Continuing to block 64, paging device 12 delays until the targeted group message time slot. Then, in block 66 paging device 12 activates during the targeted group message time slot and captures a group message, In decision block 68, paging device 12 applies appropriate error detection and, possibly, correction algorithms to establish the validity of the captured data. If the captured group message data is valid, then processing advances to decision block 70 where paging device 12 determines whether the captured group message is of interest, i.e., whether to accept and further process the captured group message.

Thus, the captured group message bears numeric indication of the message type, i.e., a value in the range 1 to k, and paging device 12 compares the indicated message type with the configuration register of FIG. 4. If the captured group message is not to be displayed, i.e., the subscription bit for the indicated information subscription service is set to zero, then processing simply returns to block 50. If, however, the subscription bit for the collected group message type is set to 1, then processing advances to decision block 72. In decision block 72, paging device 12 determines whether it should decline the collected group message based on the travel bit associated with that group message service number. In particular, if the paging device 12 is in "ROME" mode, i.e., away from its home region, and the travel bit associated with the collected group message service number is set to zero, then processing branches at block 72 and returns to block 50. If, however, the travel bit does not indicate need to decline the collected group message, then processing advances to decision block 74 where paging device 12 interrogates the beep bit associated with the collected group message service number. If the beep bit of the configuration register (FIG. 4) indicates a beep is to be executed in conjunction with receiving a group message of this type, then processing branches from decision block 74 through block 76 where paging device 12 executes a beep alarm. Processing advances from either of blocks 74 and 76 to block 78 where paging device 12 accepts and further processes the captured group message, i.e., displays the captured group message and stores it for later reference.

Returning to decision block 68, if paging device 12 has determined availability of a group message and attempted to capture in the designated time slot a group message, but was unable to collect valid data, then processing arrives at decision block 80. In decision block 80, paging device 12 determines whether additional transmissions of the same group message are still available. For example, a particular group message indicated as being available may be broadcast in a given number of subsequent sub-frames. For example, the group message may be provided in all sub-frames containing indication of the group message availability, plus the next eight sub-frames. In this manner, each paging device 12 has multiple opportunities to capture an available group message. Thus, decision block 80 determines if any such additional transmissions of the indicated available group message are pending. If no such additional transmissions of the group message are pending, then processing advances to block 82 where paging device 12 displays indication of a missed group message, with processing then advancing to block 50. As may be appreciated, the user may take advantage of the indication of a missed group message by contacting clearinghouse 10b and requesting playback of the missed group message by telephone. If, however, additional transmissions of the available group message are pending, then processing branches from decision block 80 to block 62 where paging device 12 targets the next available group message time slot.

Figure 7:
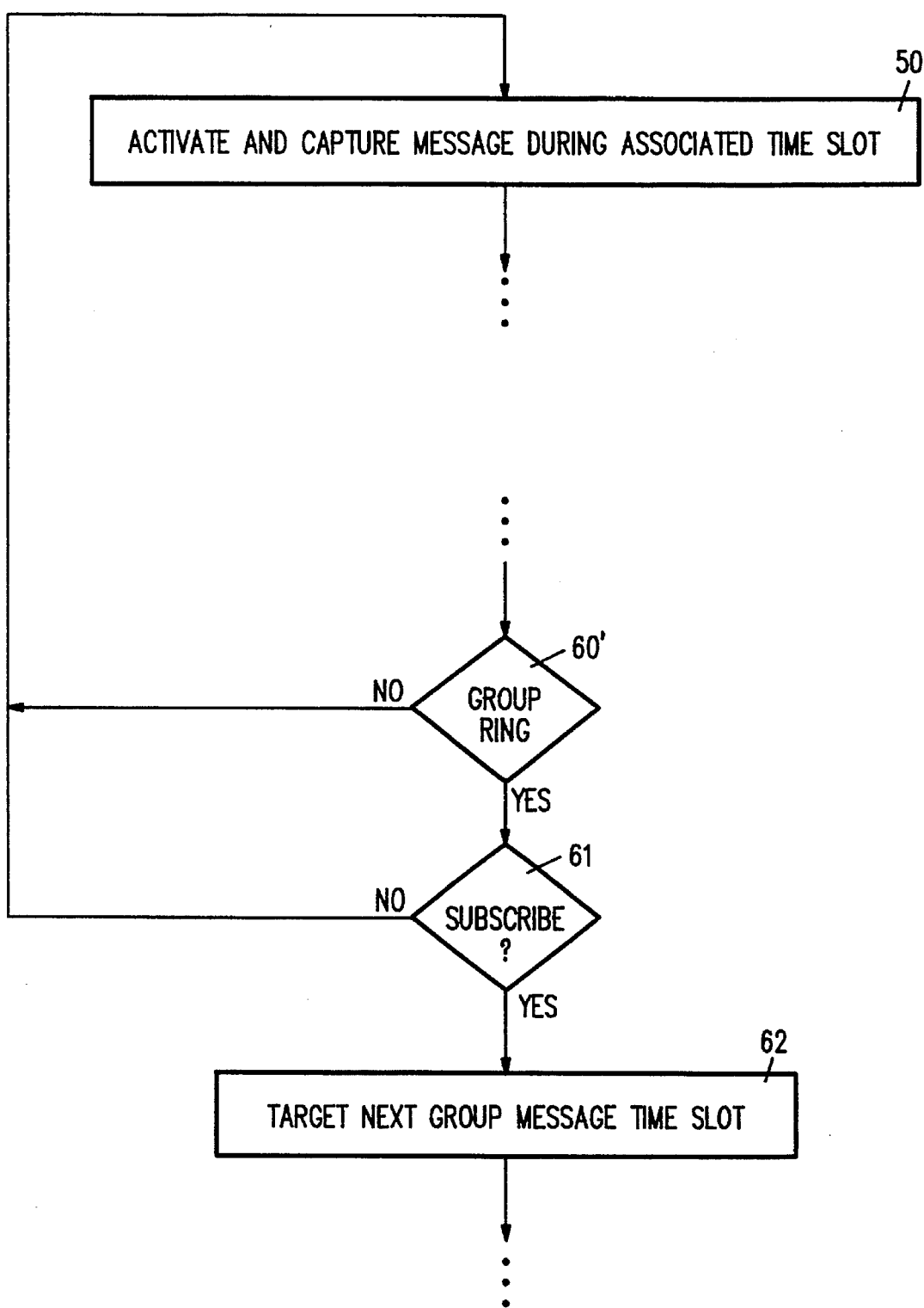
FIG. 7 illustrates programming similar to that of FIG. 6, but using a multi-bit group message ring indicator showing not only availability of a group message, but also the type of group message available.

FIG. 7 illustrates a second embodiment of the present invention wherein the group ring indicator 18d indicates the type of group message available, and thereby allows the paging device 12 to determine whether the available group message should be pursued. In particular, the group ring indicator 18d value is a group message subscription number in the range 1 to k and may be used to reference the configuration register of FIG. 4. If the available message need not be pursued, paging device 12 need not waste battery power in pursuit of an unwanted group message.

In FIG. 7, processing occurs as described above with respect to blocks 50–58. As processing enters decision block 60', however paging device 12 determines whether the multiple bit group ring indicator 18d is all zeros, indicating no group message presently available. In such case, processing returns to block 50. If, however, the multiple bit group ring indicator 18d is non-zero, then processing advances to decision block 61 wherein paging device 12 employs the value of the group ring indicator 18d to address or index the configuration register of FIG. 4. For example, if the group ring indicator 18d bears numeric value 3, then the group message service associated with numeral 3 in the configuration data register is accessed. If the associated subscription bit is set, i.e., bears value 1, then processing advances as described above to block 62 wherein paging device 12 targets the next available group message slot in pursuit of the available group message. Otherwise, processing branches at decision block 61 to block 50. Thus, by employing a multiple bit group ring indicator 18d paging device 12 need not pursue all available group messages, but rather uses the value of the multi-bit group ring indicator 18d to determine, by reference to its group message subscription configuration register, whether the available group message need be targeted and collected. Processing illustrated in FIG. 7 would continue from block 62 as described above in connection with FIG. 6, except that the decision block 70 of FIG. 6 need not be employed to determine subscription to the particular group message collected, such determination being previously made based on the value of the multi-bit group ring indicator 18d. Also, the value of the group ring indicator 18d together with the value of the associated travel bit may provide a basis for not targeting a given group message, i.e., when in "ROAM" mode and declining that type of group message.

Thus, an improved method of group message delivery in a time-division multiplexed paging system has been shown and described. Under the present invention, a single message is distributed to a selected set of paging devices with minimal degradation of overall system message handling capacity. While multiple transmissions of the group message may occur, such multiple transmissions are available to all paging devices and are provided only for the purpose of redundancy and improved message delivery reliability. In this manner, a group message is delivered efficiently to a selected set of paging devices without requiring excess message delivery bandwidth, i.e., not significantly beyond that required to deliver personal messages.

It will be appreciated that the present invention is not restricted to the particular embodiment that has been described and illustrated, and that variations may be made therein without departing from the scope of the invention as found in the appended claims and equivalents thereof.

While the present invention has been shown in connection with delivery of information subscription service messages to a set of paging devices according to associated user information subscription, it will be appreciated that the present invention may be applied to any situation where it is desirable to deliver one message to multiple devices. For example, a emergency crew, e.g., ambulance crew, fire fighting crew, or any such organized group responsive to an alarm or interested in common information, could define a set of device users and receive in common a message relative to that organization for the purpose of response to an emergency alarm or simply for the purpose of conveying information of interest to that group. Thus, the set of device users could be related as members of an organization, or simply as persons subscribing to the same information service of the system.

What is claimed is:

1. In a paging system delivering individual messages addressed to specific paging devices, a method of delivering a group message to a set of paging devices, the method comprising the steps:

providing in said individual messages addressed to specific paging devices a group ring indicator field, the group ring indicator field indicating pending transmission of said group message; and causing said set of paging devices to collect said group message in response to said group ring indicator.

2. A method according to claim 1 wherein said paging system transmits according to a time-division multiplexed broadcast protocol defining time slots and said group message is provided in a predetermined time slot.

3. A method according to claim 1 wherein said step of causing said set of paging devices to collect said group message includes the steps:

providing said group ring indicator field in a manner indicating only availability or non-availability of said pending group message;

causing all paging devices of said paging system to collect all pending group messages in response to said group ring indicator indicating availability of said pending group message; and causing said set of paging devices to at least one of display and store said collected group message in response to content of said collected group message.

4. A method according to claim 1 wherein said step of causing said set of paging devices to collect said group message includes the steps:

providing said group ring indicator field in a manner indicating availability or non-availability of said group message and further indicating a type of said group message; and causing said set of paging devices to collect said pending group message when indicated as available and when said type is one of which said set of paging devices are to pursue.

5. A method according to claim 1 wherein said paging system provides a plurality of group message subscription services, each group message subscription service being associated with a type value.

6. A method according to claim 5 wherein said step of causing said set of paging devices to collect said group message includes the steps:

providing said group ring indicator field in a manner indicating only availability or non-availability of said pending group message;

causing all paging devices of said paging system to collect all pending group messages in response to said group ring indicator field; and causing said set of paging devices to at least one of display and store said collected group message in response to an indication of group message type of said collected group message.

7. A method according to claim 6 wherein said step of causing said set of paging devices to collect said group message further includes the steps:

maintaining within each paging device a group message configuration register indicating types of group messages to be pursued by each paging device; and causing each paging device to reference said configuration register in conjunction with a message type indication of said collected group message to determine if said collected group message is to be at least one of displayed and stored.

8. A method according to claim 5 wherein said step of causing said set of paging devices to collect said group message includes the steps:

providing said group ring indicator field in a manner indicating availability or non-availability of said pending group message and further indicating a type of said group message; and causing said set of paging devices to collect said pending group message when indicated as available and when said type is one of which said set of paging device are to pursue.

9. A method according to claim 8 wherein said step of causing said set of paging devices to collect said group message further includes the steps:

maintaining within each paging device a group message configuration register indicating types of group messages to be pursued by each paging device; and causing each paging device to reference said configuration register in conjunction with the value of said group ring indicator to determine if a group message is to be pursued.

10. A paging system broadcasting individual message packets to paging devices according to a time-division multiplexed protocol wherein each of said paging devices are associated with certain time slots, a group message delivery system comprising:

a transmission facility broadcasting said individual message packets to said paging devices, some of said individual message packets including a group ring indicator field indicating pending transmission of a group message by said transmission facility; and paging devices responsive to said group ring indicator field by targeting a group message time slot and collecting a group message during said group message time slot in response to said group ring indicator field indicating pending transmission of a group message.

11. A system according to claim 10 wherein said group ring indicator field indicates only availability of a pending group message and said paging devices each target a predesignated group message time slot, collect a group message transmitted during that predesignated group message time slot, and determine based on content of said group message whether said group message is to be displayed.

12. A system according to claim 10 wherein said group ring indicator field indicates availability and type of a pending group message and each of said paging devices target a group message time slot when said group message type is a group message to be pursue thereby.

13. A system according to claim 12 wherein said group message time slot is a predesignated time slot.

14. A system according to claim 10 wherein said group message time slot is a predesignated time slot.

15. A system according to claim 10 wherein said group message time slot is a predesignated time slot, said predesignation being a function of message display capability of a collecting paging device.

16. In a paging system transmitting individual messages to paging devices according to a time-division multiplexed protocol, a method of operating at least one of said paging devices to receive group messages, said method comprising:

interrogating in a received individual message packet a group ring indicator field indicating pending transmission of a group message;

targeting a group message time slot when said group ring indicator field indicates transmission of a group message in said targeted group message time slot; and capturing said group message during said group message time slot.

17. A method according to claim 16 wherein said group message time slot is a predesignated time slot dedicated to group message transmission.

18. A method according to claim 16 wherein said interrogating step further includes determining group message type as a function of said group ring indicator field and said targeting and capturing steps are performed when said paging device subscribes to group messages of the indicated type.

* * * * *